April 23, 1968  E. F. MACKS  3,379,015

PIER CONSTRUCTION

Filed Dec. 7, 1965

INVENTOR
ELMER FRED MACKS
By Watts & Fisher, attys.

United States Patent Office 3,379,015
Patented Apr. 23, 1968

3,379,015
PIER CONSTRUCTION
Elmer Fred Macks, Willow Lane,
Vermilion, Ohio 44089
Filed Dec. 7, 1965, Ser. No. 512,085
1 Claim. (Cl. 61—4)

ABSTRACT OF THE DISCLOSURE

A pier construction for diminishing erosion of a shore line of a body of water and for enhancing beach build-up. A first pier portion of interlocking members extends at an angle from the beach and forms a trap leg for sand and fines carried in the water and a second portion formed of spaced members extends from the off-shore end of the trap leg toward the direction from which fines and sand flow and forms a wave dissipation leg.

This invention relates to a pier construction, and more particularly to a pier construction for inhibiting shore line erosion and for enhancing the rate of beach development.

Many areas of shore line, particularly along the shore lines of lakes, such as the Great Lakes, suffer from erosion. The principal cause of erosion is the wave energy of the water and the direction in which sand and other fines of the shore line tend to migrate. Another factor is the composition of the soil itself.

The southern shore line of Lake Erie in Vermilion, Ohio may be considered as illustrative. The migrations of fines and sand is predominantly westerly in this region of interest. A soil analysis reveals a shore line of approximately 2 to 9 feet of surface clay above 10 to 22 feet of hard shale, with occasional deposits of limestone. The southern shore line of Lake Erie in this region has been eroding at an average rate of between one inch per year to over one foot per year, depending upon the exact shore line location and the soil-shale-limestone composition. It can readily be appreciated that, as a result of this erosion, valuable property and desirable beaches are being lost. The same is true at other locations along the shore line and also along other bodies of water.

Many attempts have been made to prevent erosion of the type described above, and different forms of piers, terraced banks, reinforced concrete storm walls, etc., have been constructed. Specific examples of piers and walls that have been tried along the southern shore of Lake Erie are as follows:

(1) Simple stone block construction piers;
(2) Pyramid-type stone block pier construction;
(3) Slag or cement filled steel bulk heads;
(4) Rectangular or square timber cribs constructed of 12 x 12 timbers and filled with slag;
(5) Metal bins filled with large stones to obtain grout penetration;
(6) Built-up steel and concrete piers; and
(7) Concrete rings.

Each of these methods of pier or bulk head construction, in addition to the effectiveness with which it functions, has costs, construction, or life advantages, but no construction developed to date has been completely satisfactory from a combination of all desirable features.

In accordance with the present invention, a pier construction has been provided that not only will effectively diminish erosion of the shore line, but will also enhance the build-up of a breach. This beach build-up is due to (1) the normal flow propagation of fines and sand in a given direction along the shore line, e.g., east to west in the exemplified area of interest, and (2) turbulent flow propagation of fines and sand due to the resultant of wind direction, water depth, water eddies in the vicinity of the pier, flow velocity, wave form, etc. The first phenomenon accounts for a slow accumulation of beach, while the second provides a "rapid" build-up and shifting of beach along the shore line. A novel construction of a pier and an arrangement of parts at an optimum angle relative to the shore line is provided to take into account a number of the more important parameters affecting erosion and beach build-up.

One feature of this invention is the provision of a pier that extends at a predetermined acute angle from the shore toward the direction from which the fines and sand flow. The pier forms a trap leg for causing sand carried by the water to settle out along the pier. The pier preferably includes a second portion that forms a wave dissipation leg extending at an obtuse angle from the off-shore end of the trap leg toward the direction from which the fines and sand flow. Additional wave dissipation legs may be provided farther off-shore and upstream relative to the flow of sand and fines. The wave dissipation legs dissipate wave energy of the body of water before the waves reach the shore line. The trap leg serves to accumulate fines and sand from the water to build up the beach area on each side of the trap leg, but principally within the area between the trap leg and wave dissipation leg and the shore line.

Another feature of this invention is that the pier design permits construction of the pier in any kind of weather. This prevents washouts of partially completed piers, which often occur during severe northeasterly or northwesterly storms.

It is therefore an object of this invention to provide a pier construction and method of building up sand beaches in selected regions while inhibiting erosion of the shore line. Other objects, features and advantages of this invention will become readily apparent as the invention becomes better understood by reference to the following detailed description, when considered in conjunction with the accompanying drawing, in which.

Figure 1:
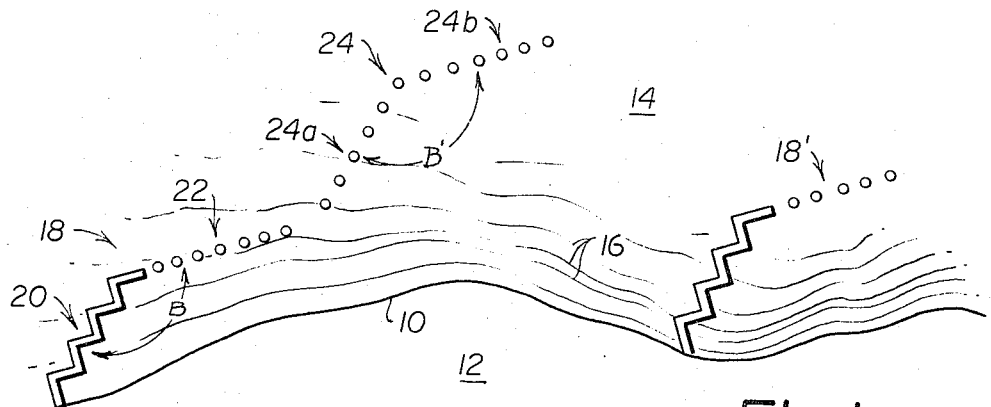
FIGURE 1 is a diagrammatic plan view of a shore line and piers constructed in accordance with this invention, and indicating streamlines of sand propagations.

Referring now to the drawings, a shore line 10 is shown in FIGURE 1 providing a demarcation between a land mass 12 and a body of water, such as a lake 14. Spaced streamlines of sand of sand propagation are shown at 16. The direction of propagation of sand and fines is from right to left in FIGURE 1.

Piers 18 and 18' constructed in accordance with the presnet invention are shown extending from the shore line 10 into the body of water 14. The number of spaced piers used depends upon the length of shore line being considered. Pier 18 will be described in detail.

The pier 18 includes a trap leg 20 extending outwardly from the shore line 10 at an acute angle and an angularly related wave dissipator leg 22 that extends from the offshore end of the leg 20 in the same general direction (i.e., upstream with respect to the direction of migration of sand and fines) along the shore line. A separate wave dissipator pier 24 in shown offshore from the wave dissipator leg 22 and upstream from the pier 18 with respect to the flow or direction of migration of fines and sand.

Figure 3:
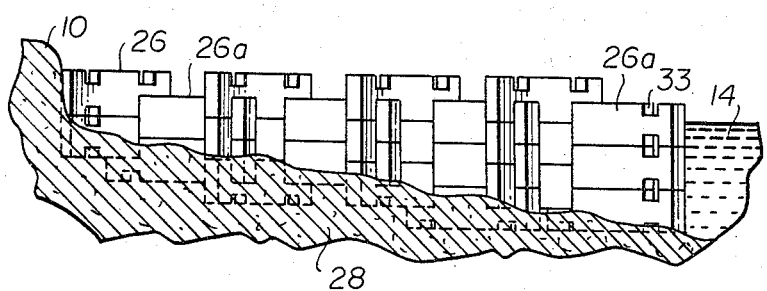
FIGURE 3 is a side elevational view of a trap leg constructed in accordance with this invention, and taken along the line 3—3 of FIGURE 2, looking in the direction of the arrows.
Figure 2:
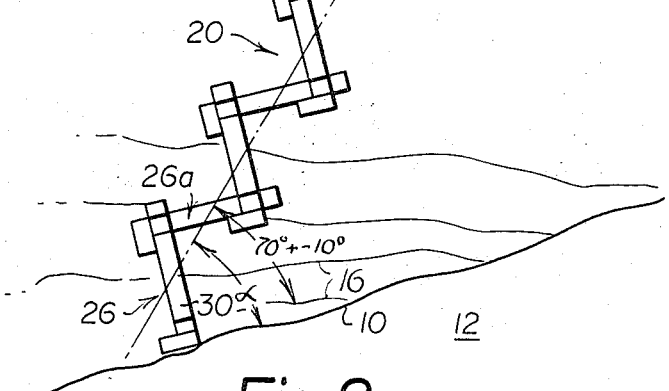
FIGURE 2 is an enlarged plan view of the pier construction as shown in FIGURE 1, indicating angular relationships between a trap leg and a wave dissipation leg and between the trap leg and the shore and streamlines of said propagation.

The construction of the trap leg 20 is best shown in FIGURES 2 and 3 of the drawings. Interlocking members 26, 26a of cut stone or cast concrete are imbedded in the shore line and along the lake bottom 28 outward from the shore line. As shown in FIGURE 3, the bottom of the lake typically slopes downward from the shore line 10, the lake 14 increasing in depth. The necessary change in the height of the trap leg 20 along the length is provided by stacking a greater number of interlocking members 26, 26a as the depth of the water increases, to provide a continuous, essentially solid, barrier from the bottom of the lake 28 to the surface of the lake 14.

Each interlocking member 26, 26a includes a leg portion 30 and a foot portion 31 at one end of the leg portion. The leg portion 30 is notched on top and bottom surfaces at 32 adjacent the foot and also at 33 adjacent the opposite end. The foot portion 31 in each member 26 extends in the opposite direction from the foot portion of each member 26a. A zigzag arrangement is provided as shown in FIGURE 2, with the members 26, 26a of each group extending at right angles to each other. The notched portions 32 and 33 of each group of members 26, 26a receive notched portions 33 and 32 of the next group of members to interlock the pieces and form a solid wall. The important feature of the interlocking arrangement is the provision of a rigid and solid pier that can be readily constructed in any kind of weather and which will withstand the forces imposed upon it by the body of water. The zigzag construction provides a maximum effective mass and maximum rigidity with a minimum of material cost. Because the pier can be constructed without cement, it will not be washed out if only partially completed when a storm occurs.

Figure 4:
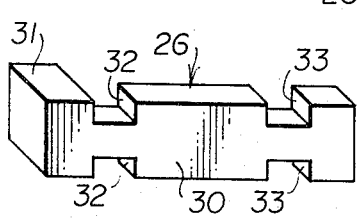
FIGURE 4 is a diagrammatic perspective view of a construction member of the pier used to construct the trap leg.
Figure 5:
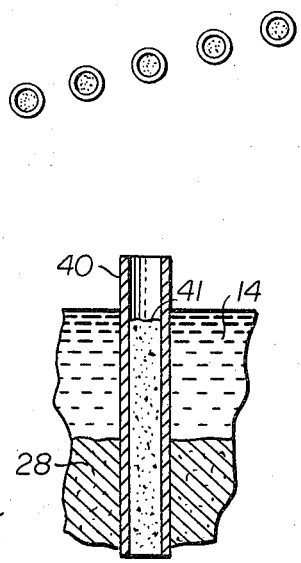
FIGURE 5 is a sectional view of a cylinder used to form the wave dissipation legs, taken along the line 4—4 of FIGURE 2, and looking in the direction of the arrows.

The construction of the wave dissipator leg 22 is best shown in FIGURES 2 and 4 of the drawings. Cement cylinders 40, open at the top and bottom, are imbedded in the lake bottom 28 a substantial distance so that the cylinder 40 will stand upright against the force of waves moving toward the shore line 10. The cylinders 40 extend above the surface of the lake 14 a distance sufficient to intercept the full depth of normal waves that wash into the shore. Additional stability is obtained by increasing the mass of the cement cylinders 40 by filling them or allowing them to become filled with sand 41.

As best shown in FIGURE 2, the cement cylinders 40 are spaced from each other along an essentially straight line extending at an obtuse angle from the outer end of the trap leg 20. The cylinders 40 are indicated as having a diameter $d$ and are shown spaced from each other a distance of $2d$ or twice the diameter. This arrangement dissipates much of the wave energy yet, because of the open areas, need not have the strength of a break wall.

The wave dissipator pier 24 is constructed of cylinders 40 of the same type used in forming the wave dissipator leg 22. The pier 24 includes a leg 24a near the wave dissipator leg 22 and a leg 24b farther off shore. Both are constructed of cement cylinders 40. They are otherwise similarly oriented and of similar length to the legs 20, 22 of the pier 18. As shown in FIGURE 1, the pier 24 is offshore and upstream, with respect to the direction of sand migration, relative to the pier 18. Additional piers 18' may be provided at spaced intervals as shown in FIGURE 1 along as much of the shore line 10 as it is desired to protect.

For optimum effectiveness of the pier construction described above, the angle $\alpha$ at which the trap leg extends from the shore line 10, must be selected to cause the maximum settling of sand from the water along the trap leg. The angle $\beta$ at which the wave dissipator leg 22 extends from the trap 20 must be properly correlated with the trap leg in accordance with ambient conditions to prevent waves from eroding the beach adjacent the trap leg. The length of the trap leg 20 should extend the pier into the water until the depth becomes too great for effectively settling sand from the water.

In the slow build-up of a beach due to the normal flow propagation of fines and sand from one direction to another along the shore line, the angle at which the trap leg 20 extends from the shore line 10 is a function of the depth of the water; the orientation of the shore line, i.e., whether for example the south shore line runs smoothly east and west or whether it is an east bank or a west bank; and the latitude. In considering the rapid build-up or shifting of a beach, the angle at which the trap leg extends is a function of the same variable plus the wind velocity, the wave velocity, the wave length, and the wave depth.

There is an optimum angle $\alpha$ at which to extend the trap leg and an optimum angle $\beta$ between the trap leg and wave dissipation leg for maximizing the rate of beach build-up and minimizing erosion, based on the variables mentioned above.

The difficulties in determining the angle $\alpha$ at which the trap leg extends from the shore line can be appreciated from the complexity of the factors that influence beach build-up. However, the streamlines of fines and sand propagation along the shore line are a function of the same variables mentioned above. These streamlines, then, bear a fixed relationship to the optimum angle at which the trap leg 20 should extend from the shore line. When the angle between the streamlines and the trap leg is 70 degrees$\pm$10 degrees and the trap leg extends from the shore toward the direction from which the sand and fines are flowing, the trap leg is properly positioned to maximize beach build-up. The trap leg 20 can therefore be properly located by determining the location of the streamlines of the fines and sand propagation. These streamlines may be readily determined by observation, for example, by introducing dyes into the water at spaced locations and observing the direction of flow. Usually the direction of flow will be in a general direction along the shore, but seldom parallel to the shore line. By locating the trap leg 20 at an angle of 70 degrees$\pm$10 degrees with these streamlines, the leg is positioned at the proper angle $\alpha$ with the shore line to effectively trap sand and fines suspended in the water and flowing along the shore line from one area to another. Once trapped, the sand and fines settle from the water. If the angle at which the trap leg extends from the shore is too large, the flow of sand and fines is merely diverted about the pier rather than trapped. If the angle is too small, the trap leg does not extend out into the body of water a sufficient distance per unit length of the leg to maximize beach build-up for a given size pier.

Because the ability of water to support suspended sand particles is a function of the velocity of the particles, the depth of the water and the sand particle size and density, more sand will be deposited when the velocity and depth are low. The trap leg 20 of the pier should extend from the shore a distance into the water determined by the depth of the water. Once the water depth reaches 20 feet there will be little or no sand particles deposited and there is no need to extend the trap leg beyond this point. In many instances it will be satisfactory to extend the trap leg only to a location where the depth of the water is 10 feet or less, particularly if the drop off is exteremely gradual.

Effective wave dissipation is achieved by establishing an angle $\beta$ between the wave dissipator leg 22 and the trap leg 20 of 150 degrees$\pm$10 degrees. Similarly, the angle between two legs 24a and 24b of the wave dissipator pier 24 shown in FIGURE 1 and indicated as $\beta'$ is also equal to 150 degrees$\pm$10 degrees, based on the strength per unit length ratio resulting in triangular sand build-up to moor the cement cylinders 40 in the bottom of the lake.

While a preferred embodiment of this invention has been disclosed with particularity, numerous modifications or alterations may be made therein without departing from the spirit and scope of the invention as set forth in the appended claim.

What is claimed is:

1. A pier construction adapted to extend from a shore line into a body of water and be supported on the bottom thereof, which comprises a first leg extending from the shore line at an acute angle of 70° with respect to adjacent streamlines of fines and sand just off the shore line, said first leg being constructed of interlocked members arranged one on top another and in a zig-zag path from the bottom of the body of water to the surface forming an essentially solid leg, said interlocking members each including an elongated portion, a shorter foot portion extending at right angles thereto, and notches along the longer portion to interlock with adjacent members, forming a rigid, solid wall that will not wash out in a storm if only partially completed, a second leg extending from an off-shore end of said first leg at an obtuse angle of 150° from the first leg in the same general direction with respect to the streamlines as the first leg, said second leg being constructed of spaced members and extending upward from the bottom of the body of water to above the surface of the body of water, said spaced members being of uniform width and spaced from each other a distance equal to twice their width and being formed of concrete cylinders oriented with the cylindrical axis extending vertically, with the lower end supported at the bottom of the body of water, and essentially filled with sand.

References Cited

UNITED STATES PATENTS

| | | | |
|---|---|---|---|
| 2,000,312 | 5/1935 | Wood | 61—4 |
| 2,191,924 | 2/1940 | Humphrey | 61—4 |
| 2,387,965 | 10/1945 | Wood | 61—4 |
| 2,639,587 | 5/1953 | Hayden | 61—4 |

FOREIGN PATENTS 425,124   3/1935   Great Britain.

EARL J. WITMER, *Primary Examiner.*